United States Patent [19]

Maeda

[11] Patent Number: 4,765,064

[45] Date of Patent: Aug. 23, 1988

[54] DIGITAL DISPLAY TYPE MEASURING INSTRUMENT

[75] Inventor: Fujio Maeda, Utsunomiya, Japan

[73] Assignee: Mitutoyo Corporation, Tokyo, Japan

[21] Appl. No.: 69,472

[22] Filed: Jul. 2, 1987

[30] Foreign Application Priority Data

Jul. 25, 1986 [JP] Japan .................. 61-174923

[51] Int. Cl.[4] .................................. G01B 3/22
[52] U.S. Cl. .................................. 33/172 E
[58] Field of Search ............ 33/172 R, 172 E, 125 C, 33/125 A, 169 R

[56] References Cited

U.S. PATENT DOCUMENTS

| | | |
|---|---|---|
| 3,660,906 | 5/1972 | Zimmerman . |
| 3,826,010 | 7/1974 | Finley . |
| 4,114,280 | 9/1978 | Rucinski . |
| 4,530,160 | 7/1985 | Feichtinger .................. 33/169 R X |
| 4,549,356 | 10/1985 | Ernst . |
| 4,566,201 | 1/1986 | Ishii .................. 33/172 E |

FOREIGN PATENT DOCUMENTS 976052 10/1950 France .................. 33/172 B
1022554 3/1966 United Kingdom .

Primary Examiner—Harry N. Haroian
Attorney, Agent, or Firm—Flynn, Thiel, Boutell & Tanis

[57] ABSTRACT

This invention relates to a digital display type measuring instrument. In a case, a pair of scales including a main scale and an index scale are provided, the index scale is fixed in the case and the main scale is slidably supported by a guide provided in the case. A spindle is supported by the case in a manner to be movable in the axial direction thereof. One end of the spindle is provided with a measuring element, and the other is located within the case and is engaged with the bottom end portion of the main scale provided in the case. The main scale is constantly biased toward the spindle by a biasing device in a manner to be operationally associated with the other end of the spindle.

8 Claims, 3 Drawing Sheets

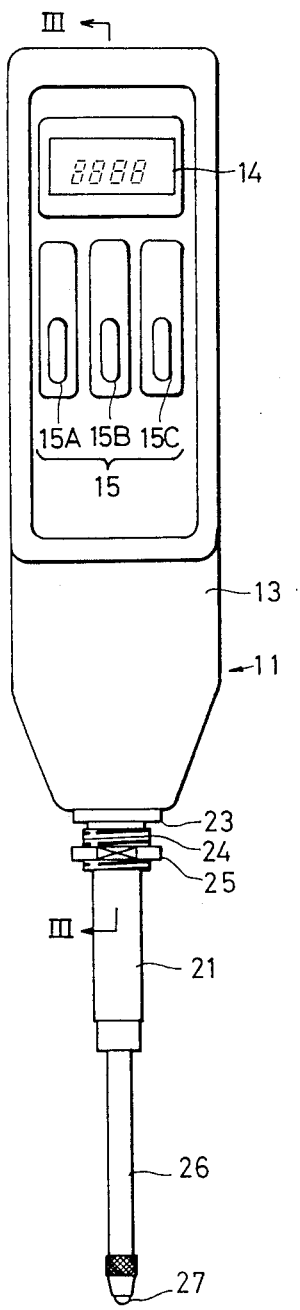
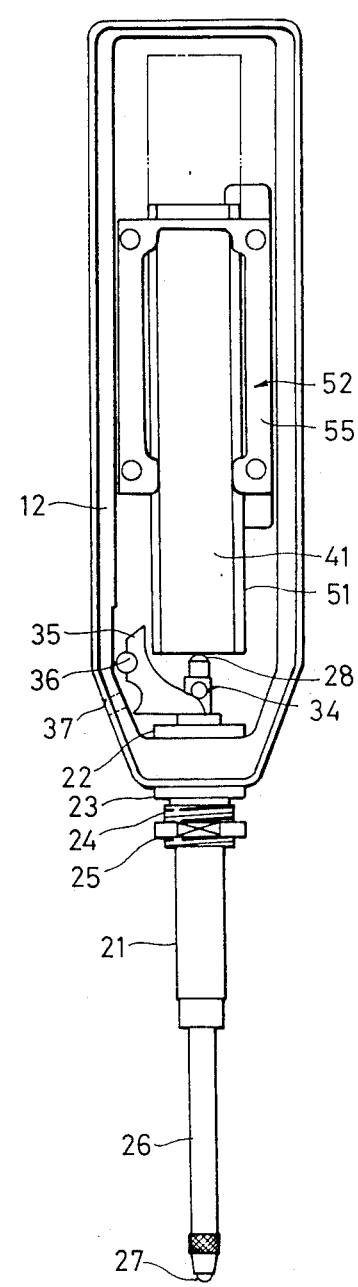

DIGITAL DISPLAY TYPE MEASURING INSTRUMENT

BACKGROUND OF THE INVENTION

1. Filed of the Invention

This invention relates to digital display type measuring instruments, and more particularly to a digital display type measuring instrument wherein a moving displacement value of a spindle in the axial direction thereof is detected as an electric signal to be displayed digitally.

2. Description of the Prior Art

The digital display type measuring instrument, wherein a moving displacement value of a spindle of a dial gauge or the like is detected as an electric signal to be digitally displayed, is more and more popularized due to the advantages such as high resolution and easiness in reading, as compared with graduation display type measuring instruments.

The measuring instrument as described above includes: a spindle axially movably provided on a case and having mounted on one end thereof a measuring element; an encoder including a pair of scales movable relative to each other in association with a movement of this spindle, for detecting a relative moving displacement value between the pair of scales as an electric signal; and a digital displayer for digitally displaying an output from this encoder. In order to secure the measuring accuracy, it is important to keep constant a positional relationship between the both scales, and particularly, a clearance therebetween.

In the conventional construction, either one of the pair of scales is integrally fixed to the spindle and the other is fixed to the case, whereby, when a deviation of the spindle in a direction other than the axial direction thereof occurs, a clearance between the both scales fluctuates thus causing an error. For this reason, such an arrangement is adopted that, to minimize deviations of the spindle in directions other than the axial direction thereof, the spindle is penetrated through the case and the spindle is supported at opposite ends thereof by the case.

However, in the above-described arrangement, either one of the scales is fixed to an intermediate portion of the spindle positioned in the case, and further, the other of the scales should be fixed into the case, as opposed to the former scale, whereby the spindle and the two scales should be housed in the case, thus inevitably increasing the thickness of the case after all.

Even in the arrangement, wherein the opposite ends of the spindle are supported by the case, errors have occurred due to the finishing accuracy of various parts and the assembling accuracy.

SUMMARY OF THE INVENTION

An object of the present invention is to provide a digital display type measuring instrument having high accuracy, being compact in size and little affected by the finishing and assembling accuracies.

To this end, the present invention contemplates in that either one of the pair of scales movable relative to each other in association with a movement of the spindle is made movable on the axial line of the spindle in a manner to be movable in the same direction as the spindle moves, and this scale is brought into abutting contact with the end of the spindle.

More specifically, the present invention features that, in a digital display type measuring instrument comprising: a spindle axially movably provided on a case and having mounted on one end thereof a measuring element; an encoder including a pair of scales movable relative to each other in association with a movement of the spindle, for detecting a relative moving displacement value between the pair of scales as an electric signal; and a digital displayer for digitally displaying an output from this encoder, the other end of the spindle is located within the case, either one of the pair of scales is secured in the case on the axial line of the spindle in a manner to be movable in the same direction as the spindle moves, the other of the scales is fixed in the case, as opposed to the aforesaid scale, and means for biasing the movable scale in a direction of abutting against the other end of the spindle is provided.

Accordingly, the scale is provided in the case in a manner to be movable in the same direction as the spindle moves and formed separately of the spindle, whereby the scale is not affected by deflections and the like in a direction other than the axial direction of the spindle, thus enabling to achieve the high accuracy. The spindle and scale are aligned in series on the axial direction of the spindle, thus enabling to decrease the case in thickness and render the case compact in size.

BRIEF DESCRIPTION OF THE DRAWINGS

FIG. 1 is a front view showing one embodiment of the present invention;

FIG. 2 is a front view showing a state where a case cover is removed;

DETAILED DESCRIPTION OF THE PREFERRED EMBODIMENT

Figure 3:
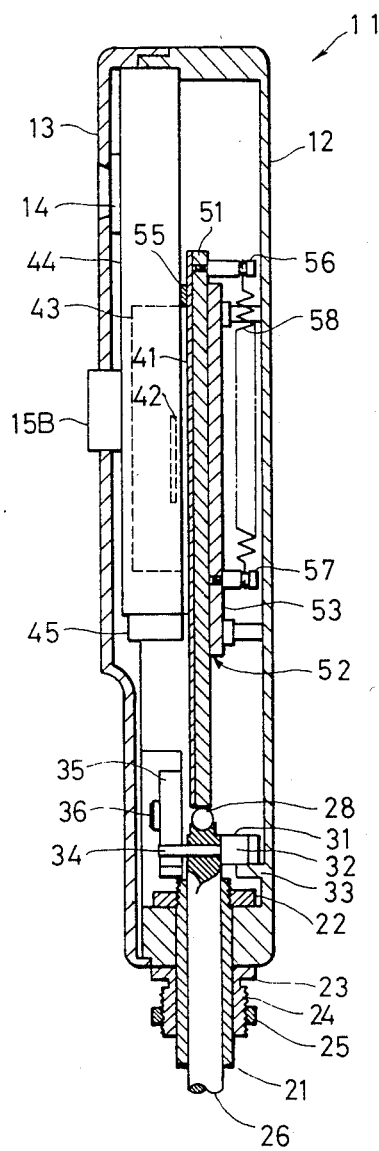
FIG. 3 is sectional view taken along the line of III—III in FIG. 1.

One embodiment of the digital display type dial gauge, to which the present invention is applied, will hereunder be described with reference to the accompanying drawings.

Referring to these drawings, a case 11 is formed to provide an elongate box shape, including an elongate case body 12 formed at the front thereof with an opening and a case cover 13 coupled into this opening. A digital displayer 14 is provided on the top portion of the surface of the case cover 13 and three function keys 15 are arranged at positions downwardly of the digital displayer 14. The function keys 15 include: a preset key 15A for setting a value displayed in the digital displayer 14 at a desirable value; a zero set key 15B for clearing a displayed value to zero; and a hold key 15C for holding a displayed value.

Inserted into a bottom wall of the case body 12 is a top end of a stem 21 which is fixed through a nut 22 and a collar nut 23. A nut 25 is threadably coupled onto external threads 24 of the collar nut 23, and this measuring instrument is adapted to be fixed to a holder such as a stand through the utilization of this nut 25 and a collar of the collar nut 23. In the stem 21, spindle 26 having mounted at one end thereof a measuring element 27 is provided in a manner to be movable in the axial direction thereof. The other end of the spindle 26 is formed into a spherical surface and located within the case body 11. The other end face of the spindle 26 is formed into a tray shape, to which is bonded and fixed a steel ball 28.

A pin 31 is projected from the spindle 26 at a position close to the steel ball 28, perpendicularly intersecting the axial line of the spindle 26. As the spindle 26 is lowered, a head 32 of the pin 31 is brought into abutting contact with a wall 33 raised on the case body 12, thereby preventing the spindle 26 from falling off. Abutted against the underside of a forward end portion 34 of the pin 31, which is opposite to the head 32 is a forward end of a lifting block 35 rotatably supported on the case body 12 through a pin 36. A hole 37 is formed in a side wall of the case body 12 at a position close to the block 35. When a release, not shown, is inserted into this hole 37 and the block 35 is rotated about the pin 36 in the counterclockwise direction in FIG. 2, the spindle 26 can be raised through the pin 31.

In the case body 12, there is housed an electric equipment unit 44 incorporating therein an electrostatic capacity type encoder 43 including a main scale 41 and an index scale 42, which move relative to each other in association with a movement of the spindle 26, for detecting a relative moving displacement value between these scales 41 and 42 as an electric signal, and thereafter, causing the digital displayer 14 to display the electric signal. The electric equipment unit 44 is secured therein a battery 45 for suppling electric power to various circuits therein, in addition to the digital displayer 14 and the function keys 15.

Figure 4:
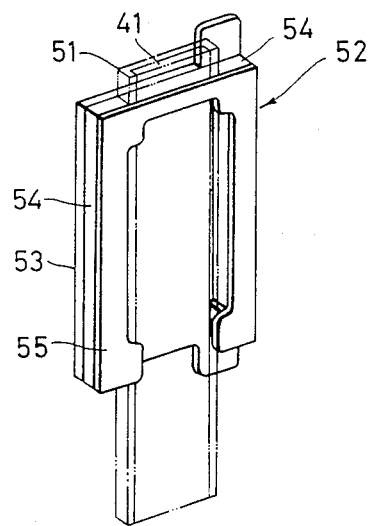
FIG. 4 is a perspective view showing a guide.

The main scale 41 has a receiving electrode, not shown, disposed in the longitudinal direction thereof and is held in a scale frame 51. The bottom end face of the scale frame 51 is formed to provide a flat surface perpendicularly intersecting the moving direction of the spindle 26. The scale frame 51 is mounted in the case 11 on the axial line of the spindle 26 in a manner to be movable in the same direction as the spindle 26 moves through a guide 52. As shown in FIG. 4, the guide 52 includes a plate-shaped base guide 53, a pair of side guides 54 and a spacer 55. The base guide 53 is fixed to the side of a bottom wall (rear wall) of the case 11. Pins 56 and 57 are projected from the top portion of the scale frame 51 and the bottom portion of the base guide 53, respectively. Stretched across the both pins 56 and 57 is a spring 58 as being means for biasing the main scale 41 to abut the bottom end flat face of the main sale 41 against the steel ball 28 positioned at the top end of the spindle 26. The electric equipment unit 44 is fixed to the spacer 55 of the guide 52.

On the other hand, the index scale 42 has sending electrodes and output electrodes, not shown, and is fixed in the electronic equipment unit 44, as opposed to the main scale 41.

Action of this embodiment will hereunder be described.

In measuring, this measuring instrument is secured to a stand or the like through the utilization of the collar of the collar nut 23 and the nut 25, and thereafter, when the spindle 26 is raised or lowered to cause the measuring element 27 of the spindle 26 to abut against a workpiece to be measured, a movement value of the spindle 26 as being a size of the workpiece is displayed by the digital displayer 14.

More specifically, the bottom end of the scale frame 51 holding the main scale 41 is brought into abutting contact with the steel ball 28 at the end of the spindle 26 through the agency to the spring 58, whereby, when the spindle 26 is raised, the main scale 41 rises against the resiliency of the spring 58, and moves relative to the index scale 42. Then, a movement value is detected by the encoder 43, and thereafter, displayed by the digital displayer 14. On the contrary, when the spindle 26 is lowered, the main scale 41 follows the lowering movement of the spindle 26 through the biasing force of the spring 58, whereby a relative movement value between the both scales 41 and 42 is detected by the encoder 43, and thereafter, displayed by the digital displayer 14.

As a consequence, according to this embodiment, the spindle 26 is separated from the main scale 41, the main scale 41 is provided in the case 11 in a manner to be movable in the same direction as the spindle 26 moves and biased in a direction of being abutted against the spindle 26 through the agency of the spring 58, and the index scale 42 is fixed in the case 11, as opposed to the main scale 41, so that a clearance between the main scale 41 and index scale 42 can be held constant at all times regardless of the movement of the spindle 26, thus achieving high accuracy.

This fact means that, when at least the main scale 41 and the index scale 42 are assembled into the case 11 with the predetermined clearance held therebetween, the both scales can be easily finished and assembled because the both scales are not so much affected by the finishing accuracy and assembling accuracy of other parts. Moreover, the main scale 41 and the index scale 42 are assembled into one and the same case 11, it is relatively easy to secure the clearance between the both scales 41 and 42 at the constance value.

The steel ball 28 having the spherical surface is provided at the other end of the spindle 26, the bottom end face of the scale steel 51, which abuts against the steel ball 28 is formed to provide a flat surface perpendicularly intersecting the moving direction of the spindle 26 and the main scale 41 is guided by the guide 52, as that the main scale 41 can be made to accurately follow the movement of the spindle 26, thus achieving the high accuracy from this respect as well.

The spindle 26 and the main scale 41 are aligned in series on the axial line of the spindle 26, so that the case 11, having a small thickness, can be rendered compact in size. Particularly, the case 11 is of the elongate shape, whereby the case can be advantageously used in a relatively small installation space.

Figure 5A:
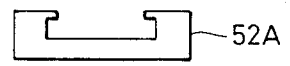
FIG. 5 is a sectional view showing a modification of the guide.
Figure 5B:
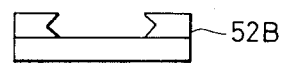

In working, the construction of the guide of the main scale 41 need not necessarily be limited to the above embodiment, and the constructions in FIGS. 5(A) and 5(B) may be adopted, for example. A guide 52A shown in FIG. 5(A) is of an inverted T-groove type, and a guide 52B shown in FIG. 5(B) is of a V-groove type.

Mounting of the spring 58 need not necessarily be limited to stretching the spring across the top portion of the scale frame 51 and the bottom portion of the base guide 53 as in the above embodiment, and the spring may be stretched between the top portion of the scale frame 51 and the case body 12. In short, any arrangement may be adopted only if the main scale 41 can be biased in a direction of abutting against the spindle 26. Further, when the spring 58 is replaced by one having a weaker tensile force, the measuring pressure can be made very weak, whereby a workpiece to be measured, which is as weak as paper, rubber or the like, can be measured for example.

The encoder 43 need not necessarily be limited to the electrostatic capacity type as described in the above embodiment, and a photo-electric type or an electromagnetic type may be adopted. However, when the electrostatic capacity type is adopted, the measuring instrument can be advantageously rendered compact in size as compared with other types. Furthermore, with the electrostatic capacity type, the types of receiving and sending signals, number of phases, shapes of electrodes and the like need not be regarded. There are suitably selected or changed in accordance with the type of measuring instrument, a space in the case body of the measuring instrument, a purpose of use of the measuring instrument or the like. The main scale 41 has been made to move association with the movement of the spindle 26, however, the main sale 41 may be fixed and the indexscale 42 may be made to move in association with the movement of the spindle 26.

The power source need not necessarily be limited to the battery 45 as described in the above embodiment, and an external power source may be adopted. Further, a connector for taking out an output of the encoder 43 to the outside may be provided, so that power may be outputted to an external component.

As has been described hereinabove, the present invention can provide a digital display type measuring instrument having high accuracy, being compact in size and little affected by the finishing and assembling accuracies.

What is claimed is:

1. A digital display type measuring instrument, comprising: a spindle axially movably provided on a case and having mounted on one end thereof a measuring element; an encoder including a pair of scales movable relative to each other in association with a movement of said spindle, for detecting a relative moving displacement value between said pair of scales as an electric signal; and a digital displayer for digitally displaying an output from said encoder; wherein the other end of said spindle is located within said case, either one of said pair of scales being mounted in said case on the axial line of said spindle in a manner to be movable in the same direction as said spindle , the other of the scales being fixed in said case, as opposed to said movable scale, and wherein means is provided for biasing said movable scale in a direction so as to abut against the other end of said spindle.

2. A digital display type measuring instrument as set forth in claim 1, wherein either one of the other end of said spindle or a scale abutting against thereto is formed to provide a flat surface perpendicularly intersecting the moving direction of said spindle and the other is formed into a spherical surface.

3. A digital display type measuring instrument as set forth in claim 2, wherein said spherical surface is formed on an inner end portion of said spindle in said case.

4. A digital display type measuring instrument as set forth in claim 1, wherein a guide for slidably supporting said scale in the moving direction of said spindle is provided in said case.

5. A digital display type measuring instrument as set forth in claim 1, wherein said pair of scales comprise a main scale and an index scale fixed in said case, and said main scale is slidably supported by a guide fixed in said case.

6. A digital display type measuring instrument as set forth in claim 5, wherein said guide comprises a plate-shaped member extending in the moving direction of said spindle, and said main scale is movable along said plate-shaped member.

7. A digital display type measuring instrument as set forth in claim 6, wherein said guide includes side guides for permitting said main scale to move only in the moving direction of said spindle.

8. A digital display type measuring instrument as set forth in claim 1, wherein said encoder is of electrostatic capacity type.

* * * * *